(12) United States Patent
Pezeshgi et al.

(10) Patent No.: US 12,111,714 B2
(45) Date of Patent: *Oct. 8, 2024

(54) APPLICATION PROFILING FOR POWER-PERFORMANCE MANAGEMENT

(71) Applicant: ATI Technologies ULC, Markham (CA)

(72) Inventors: Shahriar Pezeshgi, Richmond Hill (CA); Jun Huang, Markham (CA); Mohammad Hamed Mousazadeh, Markham (CA); Alexander S. Duenas, Markham (CA)

(73) Assignee: ATI Technologies ULC, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,963

(22) Filed: Jun. 22, 2023

(65) Prior Publication Data

US 2023/0333624 A1    Oct. 19, 2023

Related U.S. Application Data

(63) Continuation of application No. 17/133,854, filed on Dec. 24, 2020, now Pat. No. 11,703,931, which is a continuation of application No. 15/355,569, filed on Nov. 18, 2016, now Pat. No. 10,877,547.

(51) Int. Cl.
*G06F 1/32*     (2019.01)
*G06F 1/3234*   (2019.01)
*G06F 9/4401*   (2018.01)
*G06F 9/445*    (2018.01)

(52) U.S. Cl.
CPC .......... *G06F 1/3234* (2013.01); *G06F 9/4411* (2013.01); *G06F 9/44505* (2013.01); *Y02D 10/00* (2018.01)

(58) Field of Classification Search
CPC ................. G06F 1/32; G06F 9/44; G06F 1/12
See application file for complete search history.

(56) References Cited

U.S. PATENT DOCUMENTS

| 6,167,567 A | 12/2000 | Chiles et al. |
| 8,276,133 B1 | 9/2012 | Lebaredian et al. |
| 8,321,702 B2 | 11/2012 | Kaneko et al. |
| 8,352,759 B2 | 1/2013 | Thomson et al. |
| 8,607,083 B2 | 12/2013 | Kaburlasos et al. |
| 9,063,782 B2 | 6/2015 | Tennant et al. |

(Continued)

FOREIGN PATENT DOCUMENTS

| CN | 101751299 A | 6/2010 |
| CN | 104007806 A | 8/2014 |

(Continued)

*Primary Examiner* — Keshab R Pandey
(74) *Attorney, Agent, or Firm* — Volpe Koenig

(57) ABSTRACT

A processing apparatus is provided which includes memory configured to store hardware parameter settings for each of a plurality of applications. The processing apparatus also includes a processor in communication with the memory configured to store, in the memory, the hardware parameter settings, identify one of the plurality of applications as a currently executing application and control an operation of hardware by tuning a plurality of hardware parameters according to the stored hardware parameter settings for the identified application.

19 Claims, 5 Drawing Sheets

(56) References Cited

U.S. PATENT DOCUMENTS

| | | | |
|---|---|---|---|
| 9,224,442 B2 | 12/2015 | Dong et al. | |
| 2005/0204125 A1* | 9/2005 | Chin | G06F 9/4411 |
| | | | 713/100 |
| 2006/0080677 A1 | 4/2006 | Louie | |
| 2013/0111241 A1* | 5/2013 | Ha | H04W 52/029 |
| | | | 713/322 |
| 2014/0281592 A1 | 9/2014 | Bircher et al. | |
| 2014/0317427 A1 | 10/2014 | Hill | |
| 2014/0325481 A1 | 10/2014 | Pillai et al. | |
| 2015/0228244 A1 | 8/2015 | Wilson | |
| 2015/0317252 A1 | 11/2015 | Kannan | |
| 2016/0363983 A1 | 12/2016 | Wilson | |
| 2017/0116034 A1 | 4/2017 | Kattepur et al. | |
| 2017/0228849 A1 | 8/2017 | Huang et al. | |

FOREIGN PATENT DOCUMENTS

| | | | |
|---|---|---|---|
| JP | 11161383 A | 6/1999 | |
| JP | 2010256939 A | 11/2010 | |
| JP | 2013516713 A | 5/2013 | |
| JP | 2015069462 A | 4/2015 | |
| KR | 20110110737 A | 10/2011 | |
| KR | 20150131186 A | 11/2015 | |

\* cited by examiner

APPLICATION PROFILING FOR POWER-PERFORMANCE MANAGEMENT

CROSS REFERENCE TO RELATED APPLICATIONS

This application is a continuation of U.S. patent application Ser. No. 17/133,854 filed on Dec. 24, 2020, which is incorporated by reference herein in its entirety, which is a continuation of U.S. patent application Ser. No. 15/355,569 filed on Nov. 18, 2016, which is incorporated by reference herein in its entirety.

BACKGROUND

The hardware of some processing devices is managed by hardware parameters stored at the device (e.g., firmware) which are used to control operation of the hardware. The settings (i.e., dynamic power management (DPM) settings) for these parameters affect both the performance of the hardware as well as the power consumed by the hardware to perform various functions, such as executing applications. Further, the performance and the power consumption are interdependent. For example, an increase in hardware performance level often includes increased power consumption. DPM settings have historically been hardcoded in driver software, however, which cannot be altered without modifying the driver software.

BRIEF DESCRIPTION OF THE DRAWINGS

A more detailed understanding can be had from the following description, given by way of example in conjunction with the accompanying drawings wherein.

DETAILED DESCRIPTION

Figure 1:
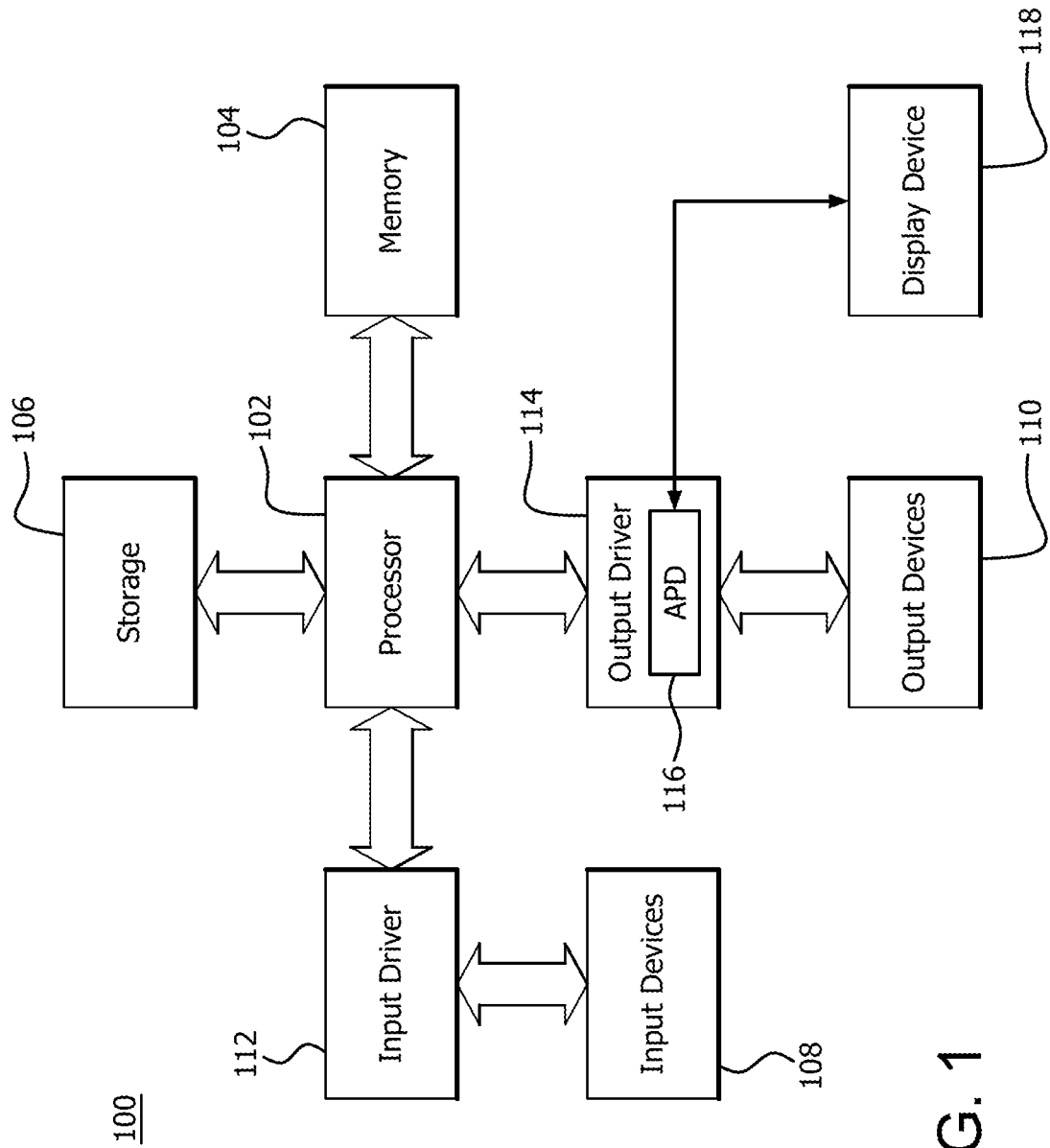
FIG. 1 is a block diagram of an example device in which application profiling for power-performance management is implemented.

Efforts have been made to provide global DPM settings for a particular integrated circuit (IC), such as an application-specific integrated circuit (ASIC). These global settings result, however, in varied performance levels. For example, an application executing on the IC at the global settings performs at a first level of performance (e.g., performance level renders a high quality of video display) while another application executes on the IC performs at a second level of performance (e.g., performance level renders a low quality of video display).

The present application discloses an apparatus and method of managing power and performance by utilizing hardware parameter settings customized for each application to be executed on a device. Customization also includes hardware parameter settings for each application programming interface (API) and each processor of the device. The hardware parameter settings are customized for each application by changing (i.e., overwriting) a configuration file of a driver stack without changing the device driver. The hardware parameter settings for an application are used to tune hardware parameters (e.g., set values of hardware parameters) stored on firmware at the device to control the power consumed by the hardware to execute the application and maintain a level of performance without affecting performance when executing other applications.

The present application provides a processing apparatus which includes memory configured to store hardware parameter settings for each of a plurality of applications. The processing apparatus also includes a processor in communication with the memory configured to store, in the memory, the hardware parameter settings, identify one of the plurality of applications as a currently executing application and control an operation of hardware by tuning a plurality of hardware parameters according to the stored hardware parameter settings for the identified application.

The present application provides a computer implemented method of power-performance management. The method includes receiving hardware parameter settings for each of a plurality of applications, storing the hardware parameter settings, executing an application of the plurality of applications, identifying the executing application and controlling an operation of hardware by tuning hardware parameters according to the stored hardware parameter settings for the identified executing application.

The present application provides a non-transitory computer readable medium including instructions for causing a computer to execute a method of power-performance management. The instructions include storing hardware parameter settings for each of a plurality of applications, executing an application of the plurality of applications, identifying the executing application and controlling an operation of hardware by tuning hardware parameters according to the stored hardware parameter settings for the identified executing application.

As used herein, programs includes any sequence of instructions to be executed using one or more processors to perform procedures or routines (e.g., operations, computations, functions, processes, jobs). As used herein, execution of programmed instructions (e.g., applications, drivers, operating systems or other software) on a processor includes any of a plurality of stages, such as but not limited to fetching, decoding, scheduling for execution, beginning execution and execution of a particular portion (e.g., rendering of video on full screen) of the programmed instructions. Programmed instructions include parameter settings (e.g., hardware parameter settings) and parameters (e.g., hardware parameters) having tunable (i.e., changeable) values used to control operation of hardware.

FIG. 1 is a block diagram of an exemplary device 100. The device 100 includes, for example, a computer, a gaming device, a handheld device, a set-top box, a television, a mobile phone, or a tablet computer. As shown in FIG. 1, exemplary device 100 includes a processor 102, memory 104, a storage 106, one or more input devices 108, one or more output devices 110, an input driver 112 and an output driver 114. It is understood that the device 100 can include additional components not shown in FIG. 1.

Example processor types for processor 102 include a CPU, a GPU, a CPU and GPU located on the same die, or one or more processor cores, wherein each processor core is a CPU or a GPU. Memory 104 is, for example, located on the same die as the processor 102 or located separately from the processor 102. Example memory types for memory 104 include volatile memory, (e.g., random access memory (RAM), dynamic RAM, or a cache) and non-volatile memory (e.g., a hard-disk, motherboard boot read only memory (ROM), and BIOS memory) configured to store, for example firmware which includes hardware parameters, as described in more detail below.

Example storage types for storage 106 include a fixed or removable storage, for example, a hard disk drive, a solid state drive, an optical disk, or a flash drive. Example input device types for input device 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Example output device types for output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components and that the device 100 will operate in the same manner if the input driver 112 and the output driver 114 are not present.

As shown in FIG. 1, the output driver 114 (e.g., graphics card) includes an accelerated processing device (APD) 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data (SIMD) paradigm. Although various functionality is described herein as being performed by or in conjunction with the APD 116, the functionality described as being performed by the APD 116 is also performed by other computing devices having similar capabilities that are not driven by a host processor (e.g., processor 102) and configured to provide graphical output to a display device 118. The functionality described herein is, for example, performed by any processing system that performs processing tasks in accordance with a SIMD paradigm. Alternatively, the functionality described herein is performed by computing systems that do not perform processing tasks in accordance with a SIMD paradigm.

Figure 2:
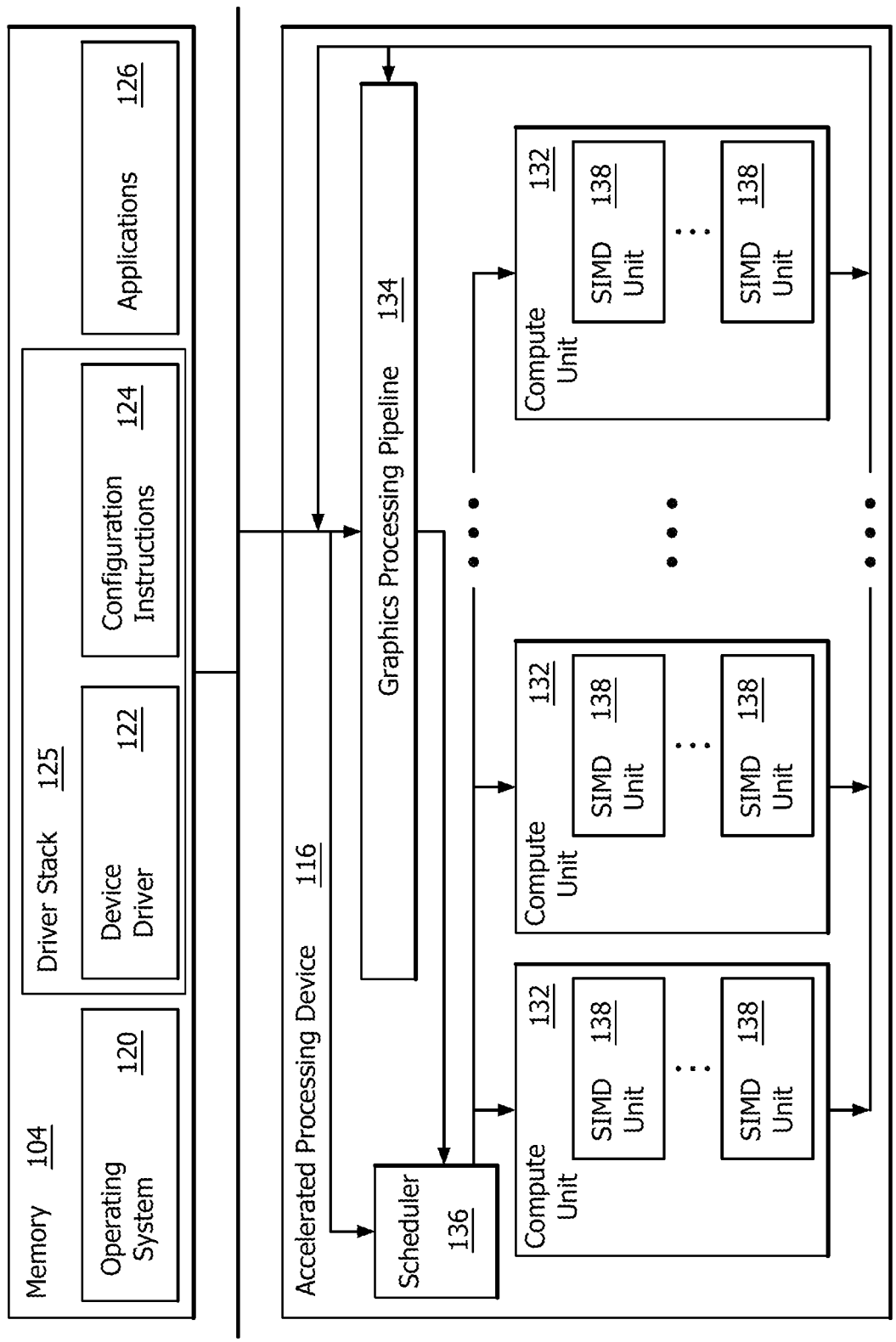
FIG. 2 is a block diagram illustrating additional details related to execution of processing tasks on the accelerated processing device shown in FIG. 1.

FIG. 2 is a block diagram illustrating additional details related to execution of processing tasks on the APD 116 of the device 100 shown in FIG. 1. The processor 102 maintains, in system memory 104, one or more control logic modules which include programmed instructions for execution by the processor 102. Programmed instructions can also be included in processor 102 (e.g., CPU). The control logic modules include an operating system 120, a device driver 122 (e.g., kernel mode driver, user mode driver, universal mode driver), applications 126 which execute on the APD 116 and configuration instructions 124 (e.g., instructions in a configuration file, blob file, extension file, and the like) which store predetermined hardware parameter settings for each executable application 126. As shown in FIG. 2, the device driver 122, and configuration instructions 124 are part of a driver stack 125. Driver stack 125 also includes, for example, programmed instructions which support the tuning of hardware parameters (e.g., clock speed parameters, clock voltage parameters, clock gating parameters) to manage the power consumption by the hardware during execution of each application.

These control logic modules control various aspects of the operation of the processor 102 and the APD 116. For example, the operating system 120 directly communicates with hardware (e.g., CPU, GPU and compute units 132) and provides an interface to the hardware for other software executing on the processor 102. The device driver 122 controls operation of the APD 116 by, for example, providing an API to software (e.g., applications 126) executing on the processor 102 to access various functionality of the APD 116. The device driver 122 also includes a just-in-time compiler that compiles programs for execution by processing components of the APD 116.

The APD 116 executes commands and programs for selected functions, such as graphics operations and non-graphics operations suited, for example, to perform parallel processing. The APD 116 is used, for example, to execute graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

Exemplary processor types for APD 116 include a CPU, a GPU, a CPU and GPU located on the same die, or one or more processor cores (i.e., compute units) 132 wherein each processor core is a CPU or a GPU. Each compute unit (i.e., compute core) 132 includes one or more SIMD units 138 each configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

A scheduler 136 is configured to perform operations related to scheduling various units of execution (e.g., work groups and wavefronts) on different compute units 132 and SIMD units 138. Execution of processing tasks on the APD 116 is suitable for graphics related operations such as pixel value calculations, vertex transformations, and other graphics operations. A graphics pipeline 134 which accepts graphics processing commands from the processor 102 can therefore provide computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
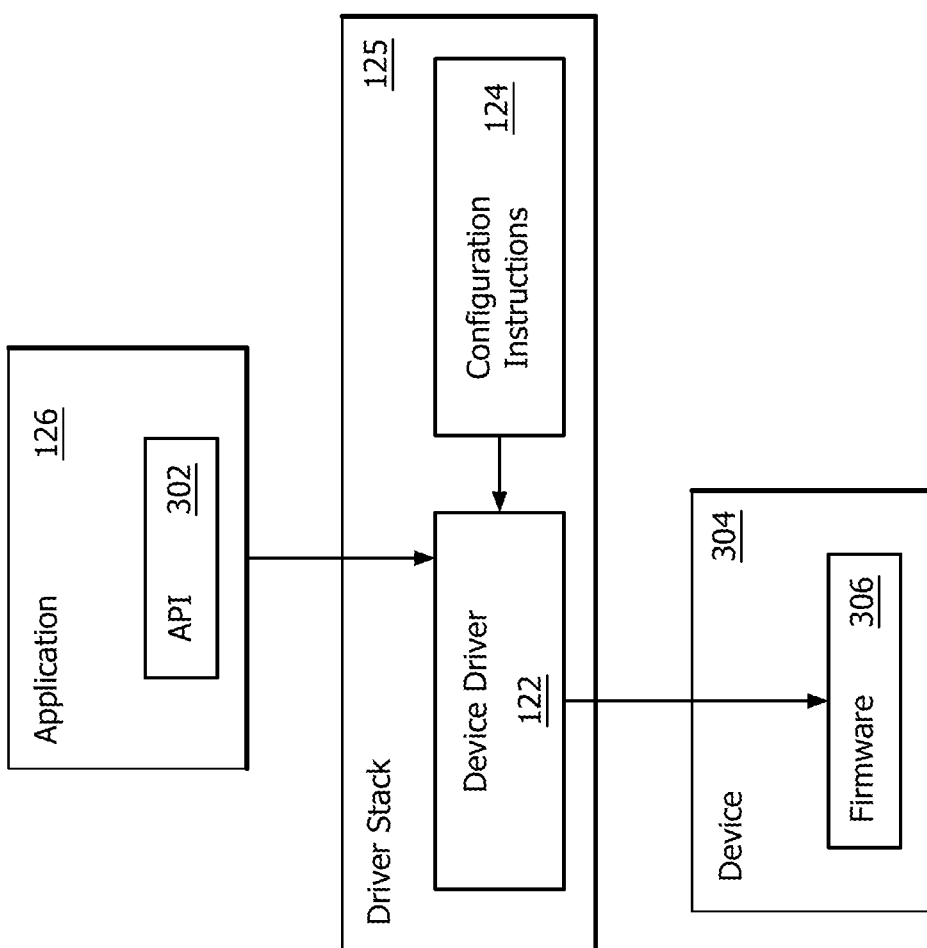
FIG. 3 is a block diagram illustrating an exemplary interconnection and information flow in an exemplary power-performance management system.

FIG. 3 is a block diagram 300 illustrating an exemplary interconnection and information flow in an exemplary power-performance management system. As shown in FIG. 3, the system includes an application 126 provided with API 302 (which represents one or more APIs), a driver stack 125 including device driver 122 and configuration instructions 124 and device 304 (e.g., output driver 114 shown in FIG. 1) including firmware 306 configured to execute at device 304.

The driver stack 125 includes device driver 122 used to interface between the operating system 120 and the firmware 306 and configuration instructions 124. The configuration instructions 124 include, for each application 126 to be processed, predetermined (e.g., determined prior to application runtime) hardware parameter settings, used to tune the plurality of hardware parameters configured to control the operation of the hardware during execution of each application 126.

Firmware 306 includes hardware parameters and associated values to control operation of hardware of the device 304 (e.g., graphics card) and provide an interface between the hardware (e.g., APD 116) of the device 304 and device driver 122. As described above, firmware is stored in non-volatile memory (e.g., a hard-disk, motherboard boot read only memory (ROM), and BIOS memory). Processor 102 is configured to identify an executing application. For example, an application executing on APD 116 at device 304 (e.g., output driver 114) is identified and firmware 306 is read from non-volatile memory (e.g., portion of memory 104) to be processed at device 304, as shown in FIG. 3. Alternatively, an application executing on a processor at device 100, which does not include output driver, is identified. The firmware 306 is used, along with the device driver 122, to control operation of hardware (e.g., APD 116 of output driver 114, one or more other processors of device 100 as well as encoders, decoders, memory cells and circuitry (not shown)).

Examples of hardware parameters include dynamic power management (DPM) parameters (e.g., clock speed parameters, clock voltage parameters, and clock gating parameters), memory timing parameters, heat generated (e.g., thermal design power (TDP)) and other parameters used to control the power distribution to execute the identified application. The APD 116 is configured to execute (e.g., schedule for execution, execute) an application 126 using, for example, the operating system 120, the device driver 122 and the configuration instructions 124. For example, the operating system 120 communicates with firmware 306 and provides an interface to the hardware for application 126 executing on the APD 116. The device driver 122 controls operation of the APD 116 by, for example, providing API 302 to applications 126 executing on the APD 116 to access various functionality of the APD 116.

Processor 102 identifies the application being executed at device 304, for example, via an application name. Processor 102 is also configured to identify the executing application 126 via an API identifier which identifies the API 302 used by the application 126. API 302 includes, for example, instructions used to interface (e.g., make requests) with the device driver 122. Examples of APIs include but are not limited to open computing language (OpenCL), open graphics library (OpenGL) and DirectX APIs.

Hardware parameter settings for an application 126 are stored in configuration instructions 124. When a new application becomes available (e.g., available to execute) for execution by a particular processor or device (e.g., graphics card), the application 126, using the provided API 302, is tested (e.g., executed) for the device with different parameter settings resulting in different levels of power consumption and performance. Each device (e.g., device 100, output driver 114, device 304) includes hardware (e.g., an IC, a processor such as processor 102 or APD 116, memory cells, an encoder, a decoder and circuitry). The hardware is identified, for example, using a hardware identifier (e.g., device ID or a revision ID). When the hardware parameter settings for the identified hardware are determined for the new application 126, the settings are sent, for example, as part of updated configuration instructions (e.g., configuration file, blob file or other file) via a network (not shown). The settings are received (e.g., at device 100) which includes the device (e.g., output driver 114, device 304) and hardware (e.g., APD 116) When the updated configuration instructions are received at the device 100, the parameter settings for the new application 126 are stored (e.g., via processor 102) in volatile memory (e.g., volatile portion of memory 104) at the device 100 by overwriting the configuration instructions 124 of the driver stack 125 without changing the device driver 122.

When the executing application 126 is identified, processor 102 controls the operation of the hardware by executing firmware 306 (e.g., at the device 304) and tuning a plurality of hardware parameters (e.g., clock voltage) according to the stored hardware parameter settings in the configuration instructions 124 corresponding to the executing application 126. Tuning is performed by setting the values associated with hardware parameters according to the hardware parameter settings stored in the configuration instructions 124. For example, when the executing application 126 is identified, device driver 122 parses the configuration instructions 124 and reads the settings from the configuration instructions 124 for the identified application 126 and API 302. The stored data is passed to device driver 122 (e.g., kernel mode driver) and additional structures, which support the stored settings to manage power and performance.

The stored settings include, for example, increasing or decreasing a value of the clock voltage parameter based on a comparison of an activity level of the hardware to a value of an activity level threshold parameter. The activity level of the hardware and the value of the activity level threshold parameter correspond, for example, to a percentage or fraction of time a processor executes during a sampling interval (e.g., 10 ms), a number of times a processor executes during a sampling interval, or another metric for measuring activity level of a processor executes during a sampling interval. For example, the value of the clock voltage parameter is decreased when an activity level of the hardware during a sampling interval is less than the value of the activity level threshold parameter and the value of the clock voltage parameter is increased when the activity level of the hardware during a sampling interval is equal to or greater than the value of the activity level threshold parameter. The settings also include, for example, setting a limit for the value of the clock voltage parameter.

Figure 4:
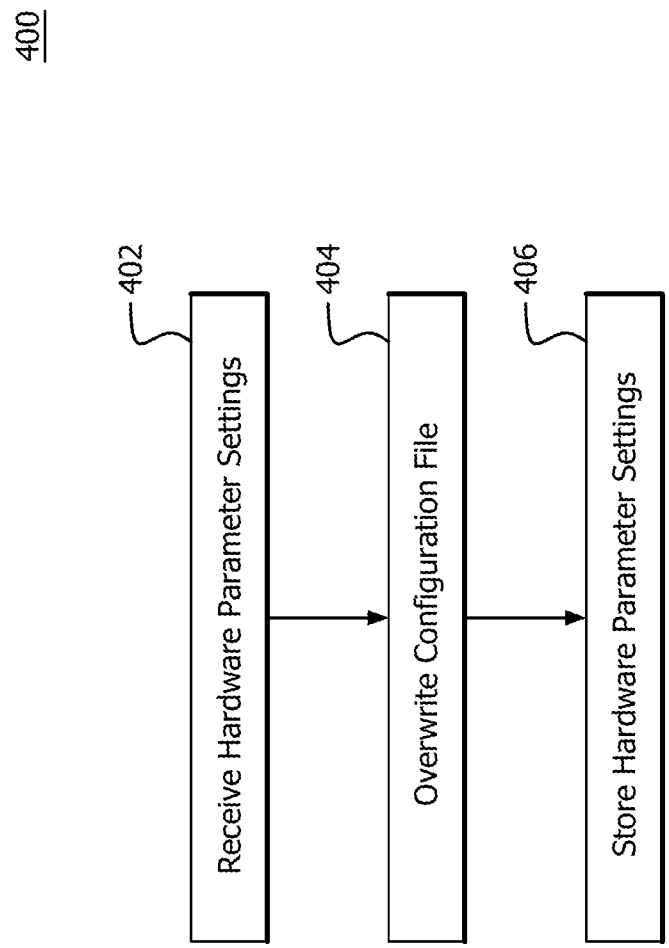
FIG. 4 is a flow diagram illustrating an exemplary method of receiving hardware parameter settings to manage power-performance.

FIG. 4 is a flow diagram 400 illustrating an exemplary method of receiving hardware parameter settings for power-performance management.

As shown in block 402 of FIG. 4, the method 400 includes receiving hardware parameter settings at a device (e.g., via a device identifier) for a plurality of hardware parameters used to control operation of hardware. The customized hardware settings are received at a device, for example, as part of a set of configuration instructions (e.g., configuration file) over a network (not shown) for updating the currently stored configuration instructions.

The configuration file is updated at block 404 of method 400. Updating the configuration instructions include, for example, overwriting each portion of the configuration file (i.e., overwriting the file itself), overwriting one or more portions of the configuration file (e.g., updating hardware parameter settings for previously received settings for one or more applications) and adding hardware parameter settings for one or more newly tested applications. Currently stored parameter settings (e.g., previously received settings for one or more applications) are identified, for example, via application names or API identifiers. The instructions are stored by overwriting the configuration instructions without overwriting or changing the device driver. That is, the settings are not hardcoded in the device driver and can be altered without modifying the device driver The updated configuration instructions are stored (e.g., as firmware) in non-volatile memory (e.g., hard-disk, motherboard boot ROM, and the like). Identifiers (e.g., application names and API identifiers) are also stored to identify hardware parameter settings with corresponding application names and API identifiers provided for the applications. When an application is executed, the instructions, including the identified hardware parameter settings for the corresponding application, are executed via memory at the device.

Figure 5:
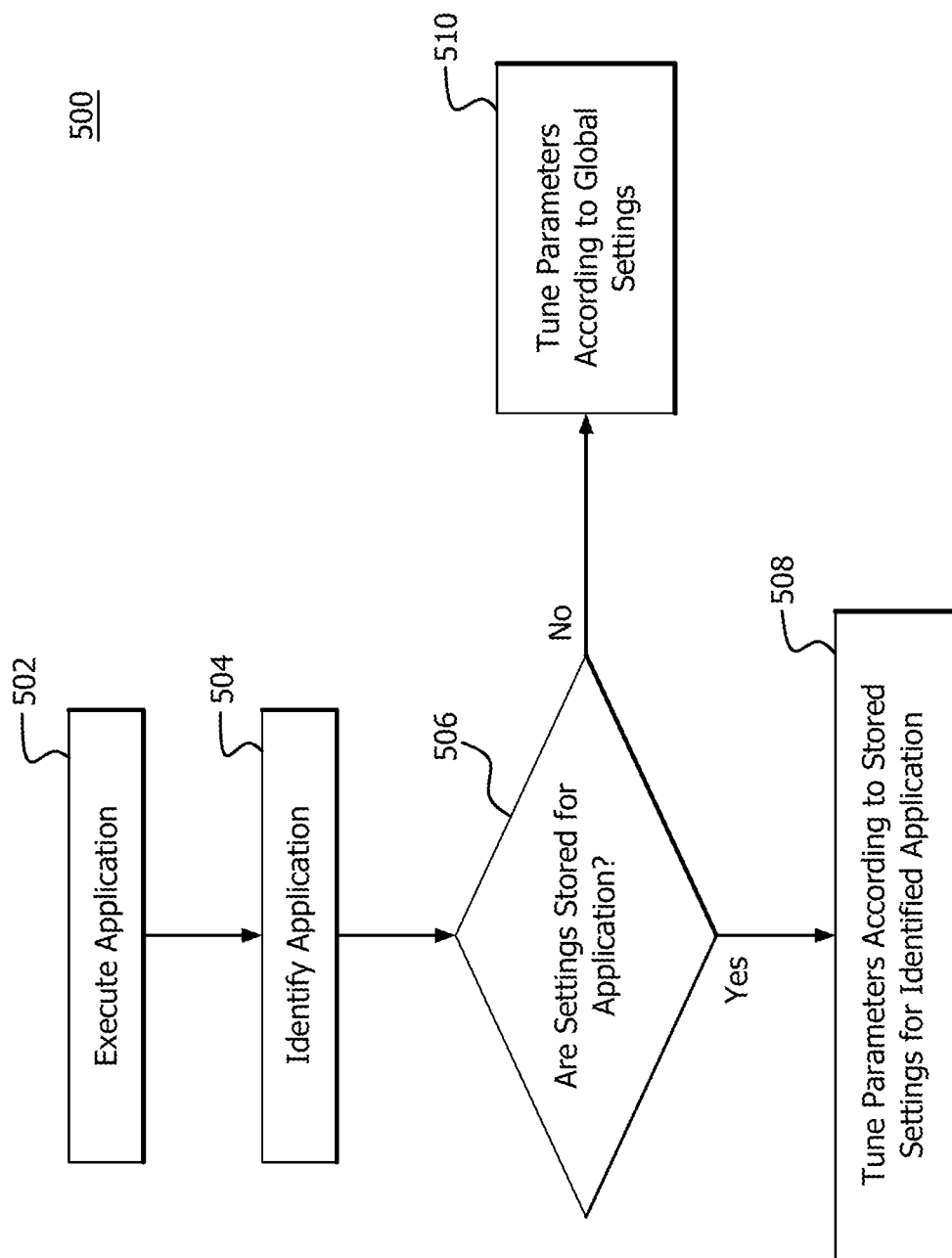
FIG. 5 is a flow diagram illustrating an exemplary method of power-performance management at application runtime.

FIG. 5 is a flow diagram 500 illustrating an exemplary method of power-performance management at application runtime.

As shown in block 502 of FIG. 5, the method 500 includes executing an application. The application is executed, for example, by fetching the application, decoding the application, scheduling the application for execution, beginning execution of the application and executing a particular portion (e.g., rendering of video on full screen) of the application.

As shown in block 504 of FIG. 5, the method 500 includes identifying the executing application. The application is identified, for example, by an application identifier that identifies the application and an API identifier which identifies an API provided for the application. Because each application and each API can result in a different performance level using the same power distribution values, the settings are customized for each application and each API to control power consumed by the hardware to execute the application and maintain a level of performance without affecting performance when executing another application.

As shown at decision block 506 of FIG. 5, the method includes determining whether hardware parameter settings are stored for the identified application. For example, it is determined whether hardware parameter settings, for the identified application, are stored in the configuration file described in FIG. 4. When parameter settings The hardware parameter settings are stored for the identified application As shown in block 508 of method 500 in FIG. 5, when it is determined that hardware parameter settings are stored for the identified application (e.g., via an application identifier and an API identifier), the hardware parameters are tuned to execute the application according to the stored hardware parameter settings for the identified application. The settings are executed via memory at the device. The tuning is used to control the operation of the hardware, such as controlling power that is consumed by the hardware to execute the identified application while maintaining a performance level of execution. For example, the power distribution is managed by tuning a clock voltage parameter (e.g., changing a value of the clock voltage parameter) based on a comparison of an activity level of the hardware during a sampling interval to an activity level threshold parameter for the sampling interval. As shown in block 510 of method 500 in FIG. 5, when it is determined that hardware parameter settings are not stored for the identified application (e.g., hardware parameter settings are not yet received for an identified application), the hardware parameters are tuned to execute the application according to stored global hardware parameter settings.

It should be understood that many variations are possible based on the disclosure herein. Although features and elements are described above in particular combinations, each feature or element can be used alone without the other features and elements or in various combinations with or without other features and elements.

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements application profiling for power-performance management.

The methods or flow charts provided herein can be implemented in a computer program, software, or firmware incorporated in a non-transitory computer-readable storage medium for execution by a general purpose computer or a processor. Examples of non-transitory computer-readable storage mediums include a ROM, a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing apparatus comprising:
   memory configured to store hardware parameter settings of a hardware device for an application, wherein the hardware parameter settings include a threshold level of execution for the application;
   a processor, in communication with the memory, configured to:
   control an operation of the hardware device by tuning at least one hardware parameter of the hardware device during execution of the application based on a determination that a level of execution of the application satisfies the threshold level of execution for a sampling time interval.

2. The processing apparatus of claim 1, wherein the processor is further configured to monitor the level of execution of the application during the sampling time interval.

3. The processing apparatus of claim 1, wherein the at least one hardware parameter includes at least one or a combination of a clock speed parameter, a voltage parameter, a clock gating parameter, a memory timing parameter, or a parameter for controlling an amount of heat generated to execute the application.

4. The processing apparatus of claim 1, wherein the at least one hardware parameter includes at least one parameter configured to control a power distribution of the hardware device to execute the application; and
the processor is further configured to control the power distribution of the hardware device by tuning the at least one hardware parameter according to the stored hardware parameter settings for the application.

5. The processing apparatus of claim 1, wherein the at least one hardware parameter includes a voltage parameter, and
the processor is further configured to tune the voltage parameter by:
comparing the level of execution monitored by the processor during the sampling time interval to the threshold level of execution;
increasing a value of the voltage parameter when the level of execution monitored by the processor during the sampling time interval is equal to or greater than the threshold level of execution; and
decreasing a value of the voltage parameter when the level of execution monitored by the processor during the sampling time interval is less than the threshold level of execution.

6. The processing apparatus of claim 1, wherein the processor is further configured to store the hardware parameter settings as configuration instructions in a configuration file separate from a device driver, and
the processor is further configured to use the device driver to parse the configuration instructions and read the hardware parameter settings from the configuration instructions for the application.

7. The processing apparatus of claim 2, wherein the level of execution monitored by the processor is a portion of the sampling time interval that the processor executes the application during the sampling time interval.

8. The processing apparatus of claim 1, wherein the memory is further configured to store a different set of hardware parameter settings for a different application, and the processor is further configured to update a configuration file for the hardware device without modifying a device driver for the hardware device when the different set of hardware parameter settings is stored for the different application.

9. The processing apparatus of claim 1, wherein the processor is further configured to determine if the level of execution of the application satisfies the threshold level of execution for the sampling time interval.

10. The processing apparatus of claim 1, wherein the processor is further configured to control the operation of the hardware device by tuning the at least one hardware parameter of the hardware device during execution of the application based on the determination that the level of execution of the application satisfies the threshold level of execution for each sampling time interval.

11. A computer implemented method of power-performance management, the method comprising:
storing hardware parameter settings of a hardware device for an application, wherein the hardware parameter settings include a threshold level of execution for the application;
controlling an operation of the hardware device by tuning at least one hardware parameter of the hardware device during execution of the application based on a determination that a monitored level of execution satisfies the threshold level of execution for a sampling time interval.

12. The computer implemented method of claim 11, further comprising storing the hardware parameter settings as configuration instructions in a configuration file separate from a device driver, and reading
the hardware parameter settings from the configuration instructions for the application.

13. The computer implemented method of claim 12, wherein a different set of hardware parameter settings is stored for a different application, and
the computer implemented method further comprises updating the configuration file without modifying the device driver when the different set of hardware parameter settings is stored for the different application.

14. The computer implemented method of claim 11, further comprising monitoring a level of execution of the application during the sampling time interval.

15. The computer implemented method of claim 11, wherein the at least one hardware parameter includes at least one or a combination of a clock speed parameter, a voltage parameter, a clock gating parameter, a memory timing parameter, or a parameter for controlling an amount of heat generated to execute the application.

16. The computer implemented method of claim 11, wherein the at least one hardware parameter includes at least one parameter configured to control a power distribution of the hardware device to execute the application; and
the computer implemented method further comprises controlling the power distribution of the hardware device by tuning the at least one hardware parameter according to the stored hardware parameter settings for the application.

17. The computer implemented method of claim 11, wherein the at least one hardware parameter includes a voltage parameter, and
the computer implemented method further comprises tuning the voltage parameter by:
comparing the level of execution monitored during the sampling time interval to the threshold level of execution;
increasing a value of the voltage parameter when the level of execution monitored during the sampling time interval is equal to or greater than the threshold level of execution; and
decreasing a value of the voltage parameter when the level of execution monitored during the sampling time interval is less than the threshold level of execution.

18. The computer implemented method of claim 11, further comprising determining if the level of execution of the application satisfies the threshold level of execution for the sampling time interval.

19. The computer implemented method of claim 11, further comprising controlling the operation of the hardware device by tuning the at least one hardware parameter of the hardware device during execution of the application based on the determination that the level of execution of the application satisfies the threshold level of execution for each sampling time interval.

* * * * *